United States Patent
Krueger (10) Patent No.: US 8,548,313 B2
(45) Date of Patent: Oct. 1, 2013

(54) AERIAL DIGITAL CAMERA AND METHOD OF CONTROLLING THE SAME

(75) Inventor: Roland Krueger, Wolfenbuettel (DE)

(73) Assignee: Trimble Germany GmbH, Raunheim (DE)

( * ) Notice: Subject to any disclaimer, the term of this patent is extended or adjusted under 35 U.S.C. 154(b) by 32 days.

(21) Appl. No.: 13/249,200

(22) Filed: Sep. 29, 2011

(65) Prior Publication Data

US 2012/0082441 A1 Apr. 5, 2012

Related U.S. Application Data

(60) Provisional application No. 61/404,296, filed on Sep. 30, 2010.

(51) Int. Cl.
*G03B 39/00* (2006.01)

(52) U.S. Cl.
USPC .......................................................... 396/7

(58) Field of Classification Search
USPC ....................................................... 396/7, 13
See application file for complete search history.

(56) References Cited

U.S. PATENT DOCUMENTS

| | | | |
|---|---|---|---|
| 3,982,255 A * | 9/1976 | Orlando | 396/13 |
| 5,668,595 A | 9/1997 | Katayama et al. | |
| 5,877,807 A | 3/1999 | Lenz | |
| 5,897,223 A | 4/1999 | Tritchew et al. | |
| 6,373,522 B2 | 4/2002 | Mathews et al. | |
| 6,834,163 B2 | 12/2004 | Trunz et al. | |
| 7,365,774 B2 | 4/2008 | Louis | |
| 8,248,497 B2 * | 8/2012 | Tanimura et al. | 348/294 |
| 8,279,293 B2 * | 10/2012 | Noto | 348/208.7 |
| 8,380,057 B2 * | 2/2013 | Wu et al. | 396/55 |
| 2006/0192858 A1 * | 8/2006 | Calvet | 348/208.7 |

FOREIGN PATENT DOCUMENTS

| | | |
|---|---|---|
| DE | 100 34 601 A1 | 1/2002 |
| DE | 603 20 580 T2 | 6/2009 |
| EP | 1 178 283 A1 | 2/2002 |
| EP | 1 570 314 B1 | 4/2008 |
| WO | 2004/055588 A1 | 7/2004 |

OTHER PUBLICATIONS

DIMAC "News DIMAC Systems, Aerial Digital Camera for all GIS needs" GIM International magazine, Jan. 2005, 2 pp.
Leberl et al., "The Ultracam Large Format Aerial Digital Camera System" Processings of the American Society for Photogrammetry & Remote Sensing, Anchorage, Alaska, May 5-9, 2003, 6 pp.
Leberl et al., "Ultracam-D: Understanding some Noteworthy Capabilities" Photogrammetry Week '05, 2005, pp. 57-68.
Masursky et al., Apollo Over the Moon: A view from Orbit (NASA SP-362), 1978, 26 pp.
Pacey et al., "Forward Motion Compensation (FMC)—Is It the Same in The Digital Imaging World?" Photogrammetric Engineering & Remote Sensing, Nov. 2005, pp. 1241-1242.
Perko, Digital Pansharpening versus Full Color Film: A Comparative Study, (publication date unknown; cited references dated 2004 and earlier), 6 pp.

\* cited by examiner

*Primary Examiner* — Rodney Fuller
(74) *Attorney, Agent, or Firm* — Bruce D Riter (57) ABSTRACT

An aerial digital camera comprises a housing 15, a lens, a frame 45, an image sensor 35 mounted on the frame, at least three flexure bearings 51 connecting the frame and the housing, the flexure bearings allowing a displacement of the frame relative to the housing in a displacement direction 67 parallel to a light receiving surface of the image sensor, a spring 69 providing a biasing force between the housing and the frame oriented in the displacement direction; and an actuator 71 for displacing the frame relative to the housing against the biasing force of the spring.

9 Claims, 9 Drawing Sheets

AERIAL DIGITAL CAMERA AND METHOD OF CONTROLLING THE SAME

RELATED APPLICATION

This application claims benefit of U.S. Provisional Application for Patent No. 61/404,296 filed 30 September 2010, the entire content of which is incorporated herein by this reference.

FIELD OF THE INVENTION

The present disclosure relates to aerial digital cameras and to methods of controlling aerial digital cameras. In particular, the disclosure relates to aerial digital cameras which allow for forward motion compensation.

BACKGROUND OF THE INVENTION

An aerial digital camera can be mounted on an aircraft, satellite or other vehicle to record images of distant objects. The forward motion of the vehicle at the time of image exposure leads to a blurring (dragging) of the recorded image. The blurring increases with exposure time, speed of the vehicle relative to the object and inversely with distance of the camera from the object. Forward motion compensation (FMC) is applied to compensate for the forward movement of the vehicle in order to reduce or eliminate blur from the recorded images. Forward motion compensation can be achieved by moving an image sensor of the aerial digital camera relative to a lens of the camera during exposure image.

Conventional cameras and control methods of cameras have been found insufficient in achieving a desired accuracy of motion compensation.

SUMMARY OF THE INVENTION

The present disclosure suggests aerial digital cameras and methods of controlling aerial digital cameras taking the above technical problems into consideration.

Embodiments of aerial digital cameras comprise a housing, a lens adapter mounted on the housing and configured to receive a lens, a frame, an image sensor mounted on the frame, and at least three flexure bearings connecting the frame and the housing, wherein the flexure bearings allow for a displacement of the frame relative to the housing in a displacement direction parallel to a light receiving surface of the image sensor, and an actuator configured to displace the frame relative to the housing in the displacement direction. It is possible to mount and orient the camera on a vehicle such that the displacement direction of the camera is oriented in the motion direction of the vehicle relative to the object to be imaged and to control the actuator such that it moves the frame and image sensor in the displacement direction during exposure of the image sensor to reduce blur in the recorded image.

According to exemplary embodiments, the camera comprises a spring providing a biasing force between the housing and the frame, wherein the biasing force is oriented in the displacement direction, and wherein the actuator is configured to apply a force opposite to the biasing force of the spring to the frame such that the actuator can displace the frame relative to the housing against the biasing force of the spring. Such configuration may allow for a precise displacement of the frame relative to the housing in repetitive movement cycles. In particular, such configuration may prevent the mechanical play which inevitably remains in mechanical components of the actuator from adversely affecting the accuracy of the sensor movement controlled by the actuator.

According to some embodiments, the actuator comprises a motor, a cam rotatably supported on the housing and driven by the motor, and a cam follower engaging the cam, wherein a component of the cam follower abuts against the frame. The combination of a cam and a cam follower displacing the frame carrying the image sensor against the biasing force of a spring has been found reliable for achieving a high number of repetition cycles of accurate sensor movement.

According to some embodiments herein, the cam and cam follower include a ball bearing having an inner race and an outer race, wherein a center of the inner race is displaced in a radial direction of the inner race relative to an axis of rotation of the inner race. In such configuration, the inner race of the ball bearing is mounted eccentrically relative to its axis of rotation such that the inner race of the ball bearing provides the cam, wherein the balls and the outer race of the ball bearing provide a portion of the cam follower. An outer periphery of the outer race may then abut against the frame either directly or via an intermediate structure, such as a pin, wherein the outer race does not rotate relative to the frame or the pin, and sources of inaccuracy, such as sliding relative movement between the outer periphery of the outer race of the ball bearing and the pin or frame do not occur.

According to some embodiments, at least one of the at least three flexure bearings includes an elongated strip of a flexible material. The elongated strip has a cross section which is in itself elongated such that a dimension of the cross section in one direction is substantially greater, such as five or even more greater, than in a direction orthogonal thereto. With such configuration, the flexure bearing defines the direction into which the frame and image sensor can be displaced relative to the housing, such that other mechanical structures, such as guiding rails or other which might produce friction, can be avoided.

According to embodiments, an aerial digital camera comprises a housing, a lens mounted on the housing, an image sensor movable relative to the housing, a shutter configured to allow exposure of the image sensor through the lens when it is open and to prevent exposure of the image sensor when it is closed, an actuator configured to move the image sensor relative to the housing, and a control system configured to control the shutter and the actuator.

According to exemplary embodiments, the control system is configured to control the shutter by triggering a shutter cycle at a selectable time, wherein the shutter cycle comprises opening the shutter, maintaining the shutter open during an exposure time and closing the shutter, wherein a shutter delay is defined by a time difference between a time when the shutter cycle is triggered and a time when the opening of the shutter is completed. This time difference can be caused by a time needed to energize an actuator, such as a coil, which is configured to move components, such as blades, of the shutter, and to accelerate such components which have to physically move to achieve the opening of the shutter.

According to further embodiments, the control system is configured to control the actuator by triggering an image sensor movement cycle comprising accelerating the image sensor and maintaining the image sensor at a constant sensor velocity during a time interval including the opening of the shutter and the closing of the shutter. It is desirable that the image sensor is already moving at its constant velocity when the opening of the shutter is completed and/or when the exposure of the image sensor begins. It is therefore advisable, to trigger the image sensor movement cycle a sufficient time before the opening of the shutter is completed since some time is needed to accelerate the image sensor until it reaches its desired constant velocity, and wherein additional time can be provided during which vibrations of the image sensor caused by the acceleration may decay.

According to embodiments herein, the control system is configured to determine a time difference between the time when the shutter cycle is triggered and the time when the image sensor movement cycle is triggered based on the shutter delay and the constant sensor velocity.

According to other embodiments, the control system is configured to repetitively trigger shutter cycles and image sensor movement cycles such that, in each cycle, an optical axis of the lens intersects a same predetermined pixel of the image sensor at the time when the opening of the shutter is completed. Such configuration may ensure that a field of the object imaged on the image sensor exactly corresponds to a position relative to the object of the vehicle on which the camera is mounted at the time when the exposure starts. Images recorded according to such method can then be advantageously used in an image analysis, such as three dimensional reconstruction of the object, which depends on the positions relative to the object from which the images were taken.

According to embodiments, the constant sensor velocity is determined based on at least one of a distance of the camera from the object to be imaged, a speed of the camera relative to the object, and a focal length of the lens of the camera.

According to exemplary embodiments herein, the time difference between the time when the shutter cycle is triggered and the time when the image sensor movement cycle is trigged is determined such that an optical axis of the lens intersects a same pixel of the image sensor at times when the opening of the shutter is completed at each of plural different constant sensor velocities.

Similarly, according to other exemplary embodiments, the camera is configured such that plural different lenses having shutters with different shutter delays can be selectively mounted on the camera, and the time differences between the times when the shutter cycles are triggered and the times when the image sensor movement cycles are triggered are determined such that the optical axes of the lenses intersect a same pixel of the image sensor when the opening of the shutter is completed, irrespective of which lens is mounted on the camera.

According to other embodiments, a data memory for storing the shutter delay is integrated with the lens, and the control system is configured to read the shutter delay from the data memory and use the read shutter delay in determining the time difference. The data memory may also store data related to lens parameters, such as the focal length of the lens, and the control system may also read out those data and use it in determining the constant image sensor velocity. Such embodiment can be in particular useful in applications using plural different lenses which are selectively mounted on the camera.

Embodiments of the present disclosure also provide methods of upgrading an existing aerial digital camera which does not offer forward motion compensation, and an upgrade kit which can be used to add forward motion compensation to an existing aerial digital camera.

According to embodiments, an aerial digital camera upgrade kit comprises:
a housing element configured to be integrated into an aerial digital camera and to provide a component of a housing of the aerial digital camera;
a frame configured to receive an image sensor;
at least three flexure bearings connecting the frame and the housing element, the flexure bearings allowing a displacement of the frame relative to the housing element in a displacement direction parallel to a light receiving surface of the image sensor;
a spring providing a biasing force between the housing and the frame oriented in the displacement direction; and
an actuator configured to displace the frame relative to the housing against the biasing force of the spring.

Embodiments of a method of upgrading an existing aerial digital camera to provide forward motion compensation comprise mounting the upgrade kit mentioned above to the existing camera.

Further embodiments provide a method of controlling an aerial digital camera, wherein the method comprises: triggering a shutter cycle at a first time, wherein the shutter cycle comprises opening the shutter, maintaining the shutter open during an exposure time and closing the shutter; and triggering an image sensor movement cycle, wherein the image sensor movement cycle comprises accelerating the image sensor, and maintaining the image sensor at a constant sensor velocity during a time interval including the opening of the shutter and the closing of the shutter, wherein the triggering of the sensor movement cycle is performed at a second time; wherein a difference between the first time and the second time is set based on a shutter delay and the sensor velocity, and wherein the shutter delay is defined by a time difference between a time when the shutter cycle is triggered and a time when the opening of the shutter is completed.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

In the exemplary embodiments described below, components that are alike in function and structure are designated as far as possible by like reference numerals. Therefore, to understand the features of the individual components of a specific embodiment, the descriptions of other embodiments and of the summary of the invention should be referred to.

Figure 1:
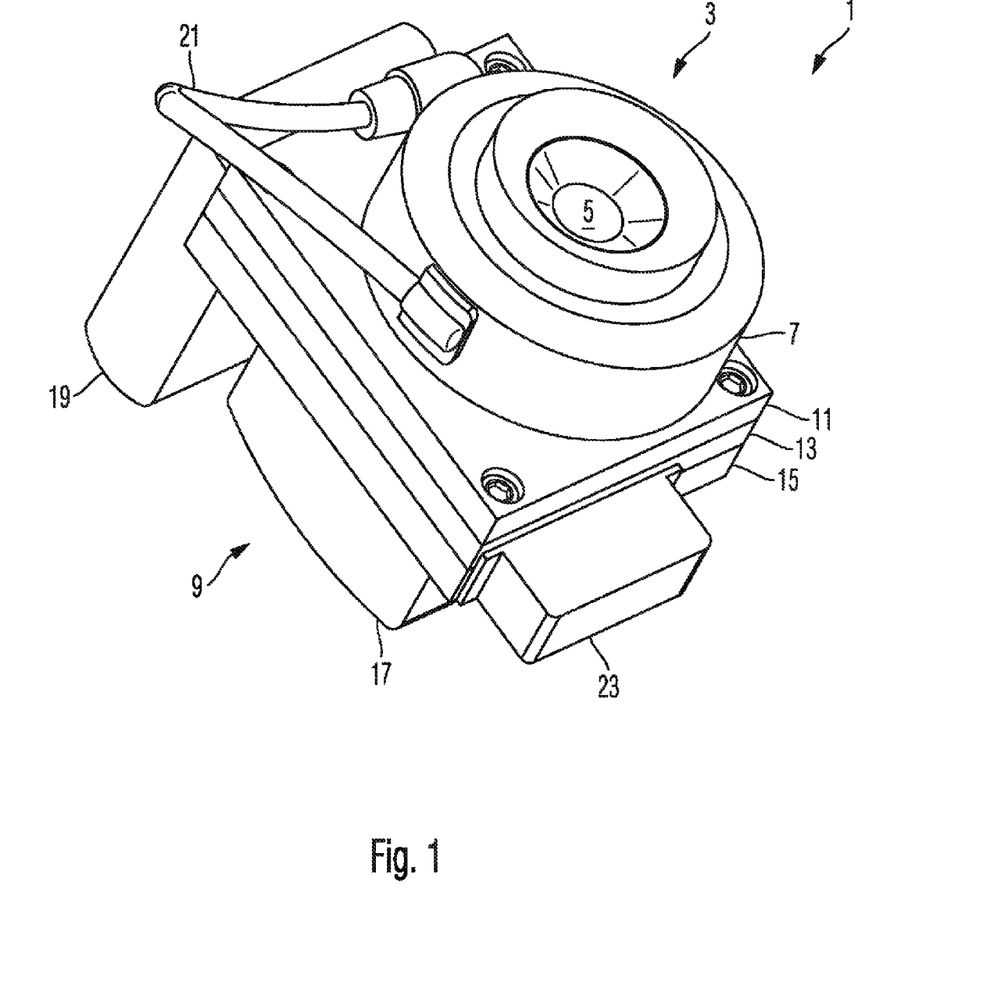
FIG. 1 is a schematic perspective view of an aerial digital camera according to an embodiment.

An exemplary embodiment of an aerial digital camera will be illustrated below with reference to FIGS. 1 to 7. FIG. 1 is a schematic perspective illustration of the camera 1. The camera comprises a lens 3 including a lens barrel, wherein a front lens 5 of the lens barrel is visible in FIG. 1. The lens 3 further includes a mechanical shutter positioned in an aperture plane of the lens barrel, wherein a housing of components of the shutter, such as blades and actuators of the shutter is indicated in FIG. 1 at 7.

The camera 1 further comprises a housing 9 comprising plural plates 11, 13, 15 and a cover 17. An electronic control unit 19 is attached to the housing 17 and includes electronic circuitry of a control system of the camera 1 illustrated in more detail with reference to FIGS. 8 and 9 below.

Figure 2:
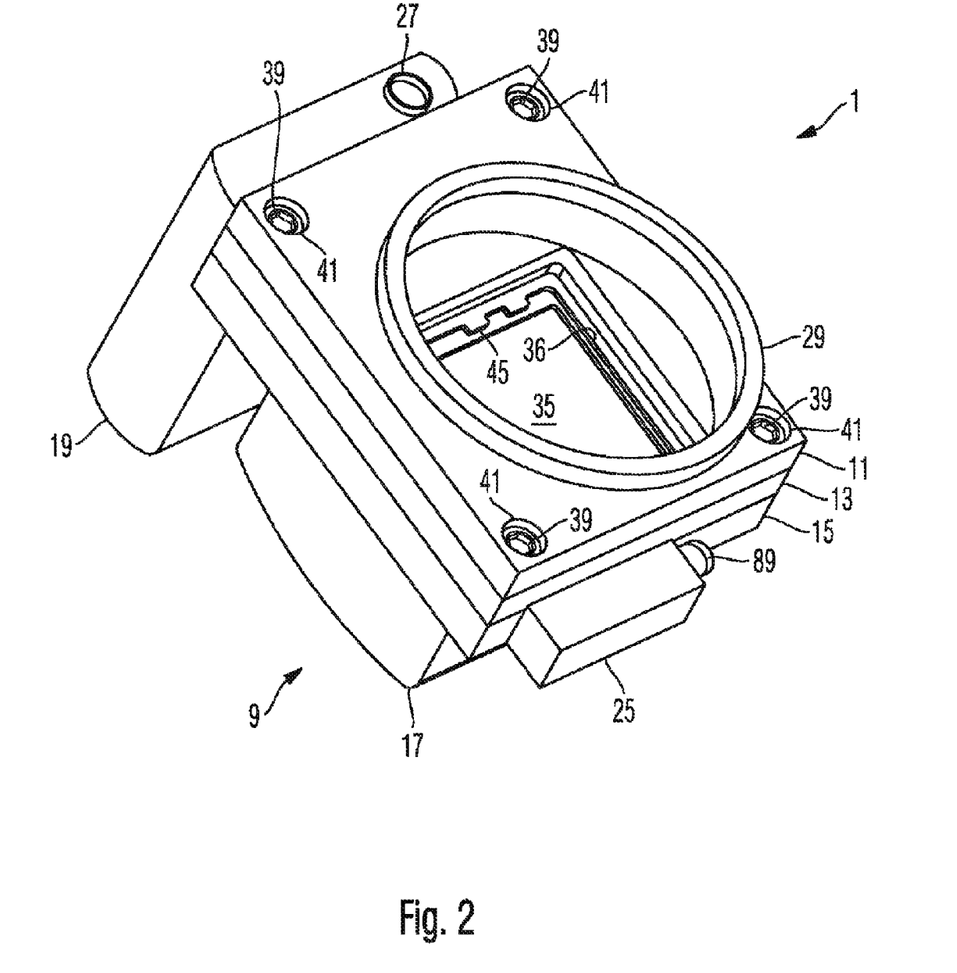
FIG. 2 is a perspective schematic view of the camera shown in FIG. 1 having a lens removed.

FIG. 2 is a perspective schematic representation of the camera 1 of FIG. 1 but has the lens 3, a cable 21 connecting the electronic control unit 19 and the shutter 7, and a protective cover 23 of a motor 25 removed, such that a connector 27 of the electronic control unit 19, the motor 25, a lens adapter 29 and details of components located within the housing 9, including a light receiving surface 35 of an image sensor 36 are visible in FIG. 2.

Figure 3:
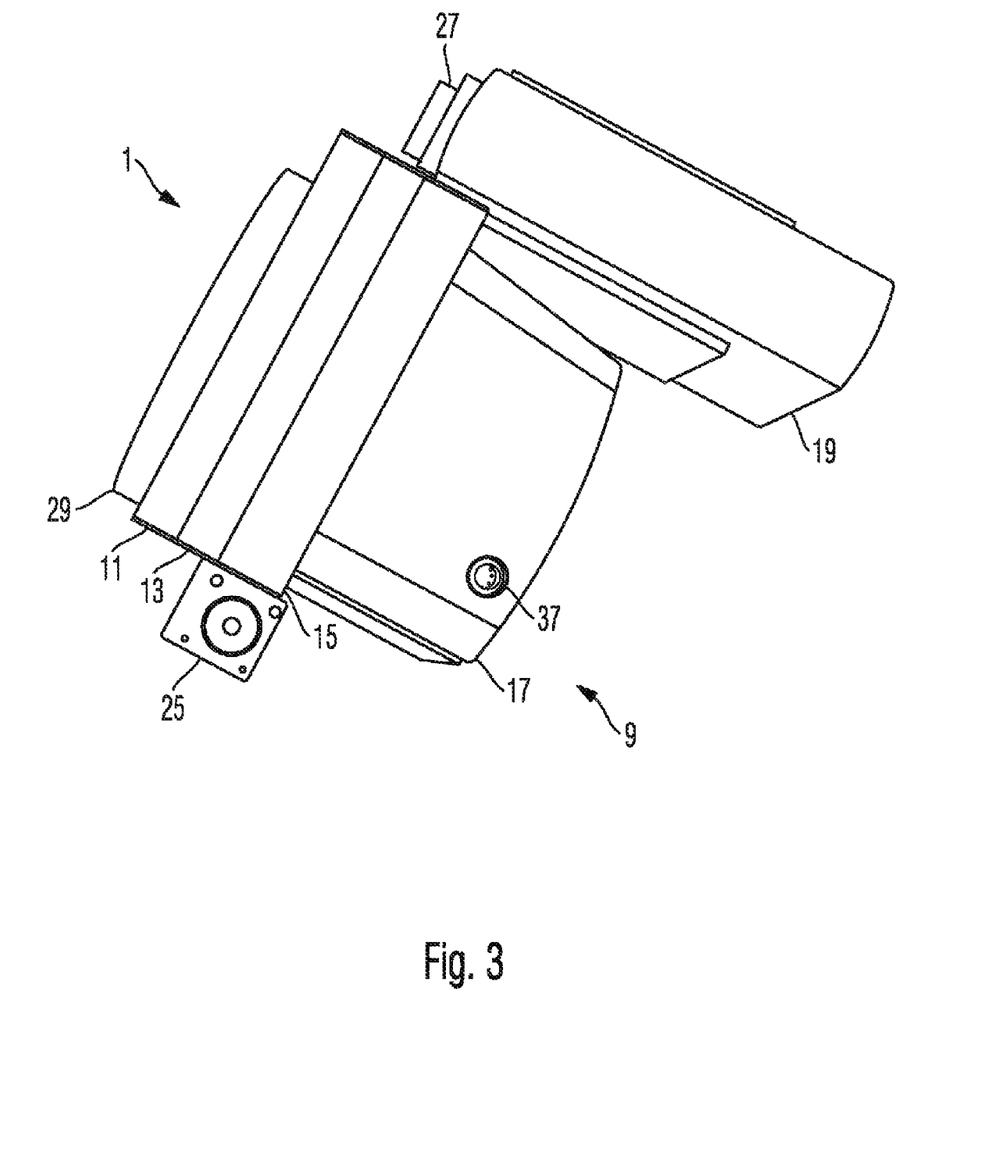
FIG. 3 is a side elevational view of the camera shown in FIG. 2.

FIG. 3 is a side elevational view of the camera 1 shown in FIG. 2, wherein a connector 37 mounted on the cover 17 of the housing 9 is shown in FIG. 3. The connector 37 has pins connected via a cable to the image sensor 36, and a cable can be attached to the connector 37 to connect the image sensor 35 to the electronic control unit 19.

The lens adapter 29 has a configuration of a bayonet and is mounted to plate 11 of the housing 9. The plate 13 of the housing 9 has a function of a spacer 13, and the plate 15 of the housing 9 has a function of mounting the image sensor 35 to the housing 9. The plates 11, 13 and 15 are held together by screws 39 extending through corresponding holes 41 of the plates 11, 13, 15.

Figure 4:
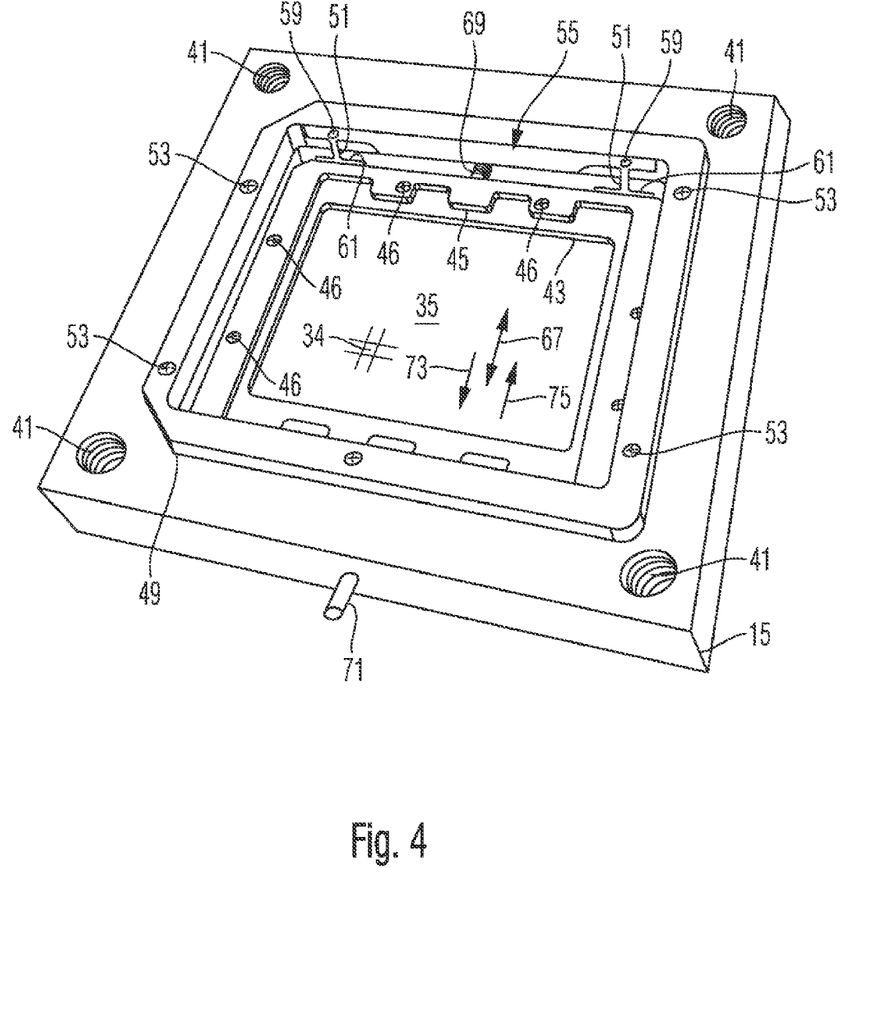
FIG. 4 is a further perspective view of a detail of the camera shown in FIG. 1.

FIG. 4 is a perspective schematic illustration from above showing the plate 15 and components for mounting the image sensor 36 in more detail. The light receiving surface 35 of the image sensor 36 is surrounded by a housing 43 of the image sensor 36 which is attached to a sensor frame 45 by screws 46. The frame 45 is suspended on a holding frame 49 by four flexure bearings 51. The holding frame 49 is attached to plate 15 by screws 53.

Figure 5:
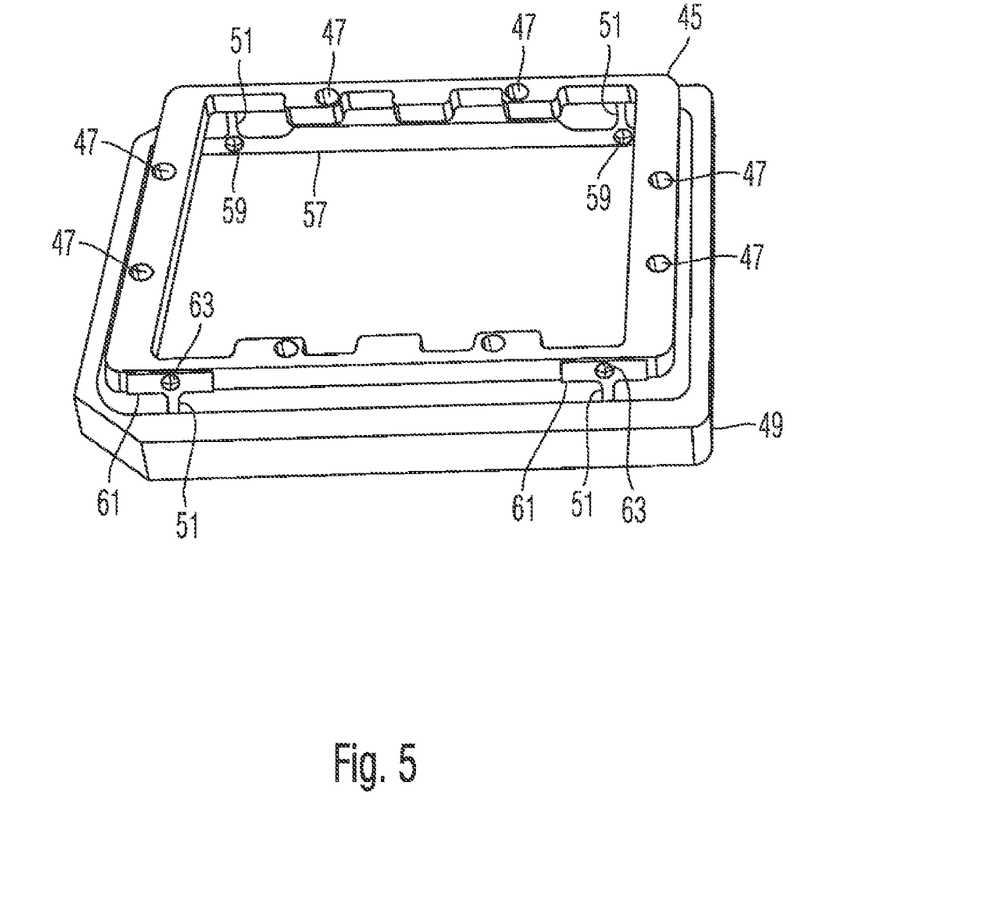
FIG. 5 is a still further perspective view of a detail of the camera shown in FIG. 1.

FIG. 5 is a perspective schematic illustration of the sensor frame 45, the mounting frame 49 and the flexure bearings 51 from below, wherein the image sensor 36 is removed from the sensor frame 45 such that screw holes 47 provided in the sensor frame 45 for the screws 46 are visible in FIG. 5.

In the illustrated embodiment, each of two pairs of flexure bearings 51 is cut from a sheet 55 of bronze material having a thickness of 0.2 mm such that an upper strip 57 of the sheet material connects two flexure bearings 51, wherein the upper strip 57 is attached to the mounting frame 49 with two screws 59. The flexure bearings 59 connect the upper strip 57 with lower tabs 61 which are attached to the sensor frame 45 by screws 63. The flexure bearings 51 extend between the upper strip 57 and the lower taps 61 and have, in the illustrated example, a length of 6 mm, the thickness of the sheet material of 0.2 mm and a lateral with of 1.3 mm. Such configuration of flexure bearings 51 allows displacement of the sensor frame 45 relative to the mounting frame 49 in a displacement direction indicated by an arrow 67 in FIG. 4. Thus, the image sensor 36 is displaceable in the direction 67 relative to the housing 9 of the camera 1.

The position of the image sensor 36 relative to the housing 9 is controlled by two pins 69 and 71 (see FIG. 4) abutting against the sensor frame 45 from opposite directions. The pin 69 is fixed in a bore provided in the plate 15 and comprises a spring 69 to press the pin 69 against the sensor frame 45, wherein the spring 69 produces a force to urge or bias the sensor frame 45 in a direction parallel to the displacement direction 67 and indicated by an arrow 73 in FIG. 4. The pin 71 abuts against the sensor frame 45 and extends through the plate 15 such that a force applied to the pin 71 from outside the plate 15 can displace the sensor frame 45 against the force of pin 69 in a direction parallel to the displacement direction 67 and indicated by an arrow 75 in FIG. 4. The pin 71 is controlled by an actuator 77 illustrated in more detail with reference to FIGS. 6 and 7 below.

Figure 6:
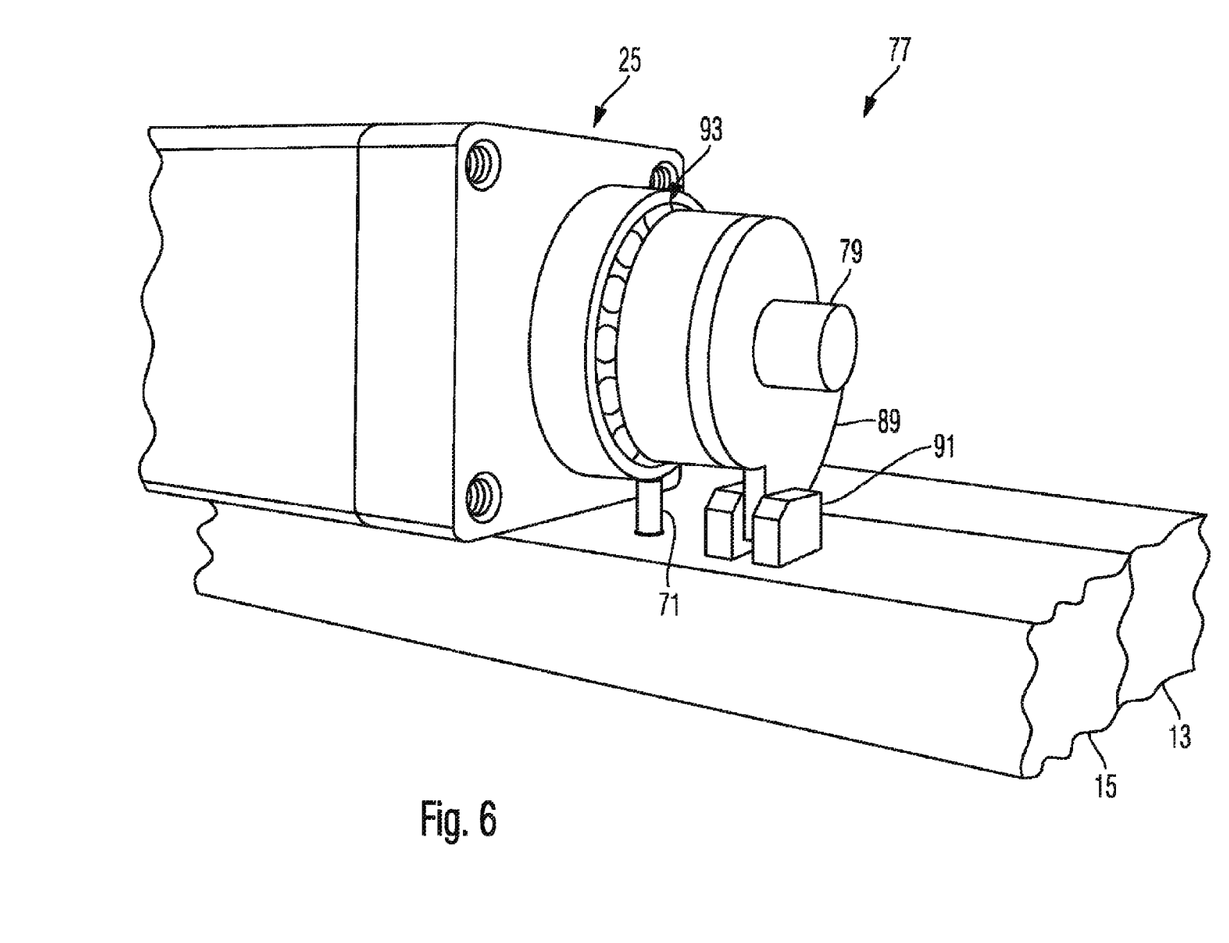
FIG. 6 is a perspective view of a detail of the camera shown in FIG. 1.

The motor 25 is a stepper motor mounted on the plate 15 and has an axis 79 rotatably driven under the control of a control system illustrated in more detail below. An eccentric blade 89 is fixed to the motor axis 79, and a photo sensor 91 is provided to detect at least one rotary home position of the axis 79.

Figure 7:
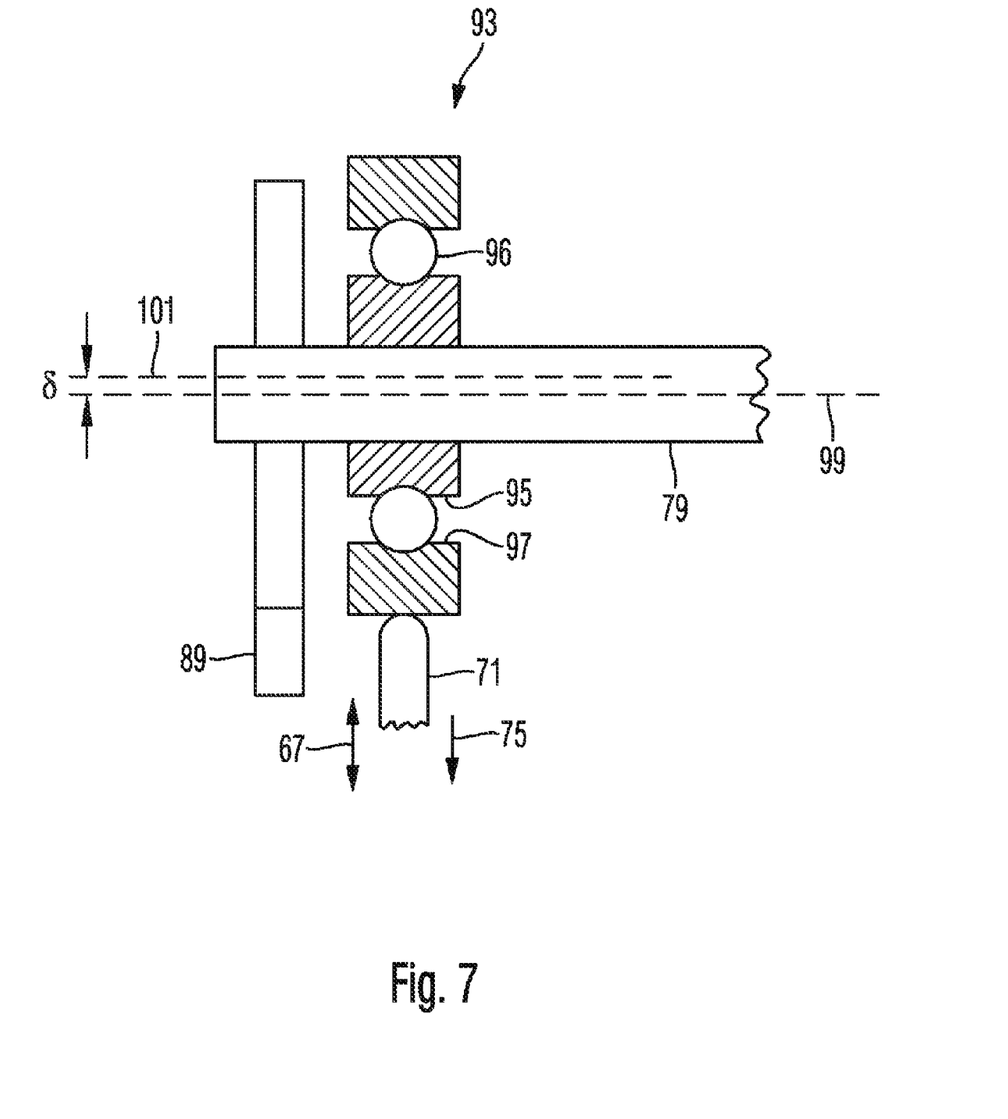
FIG. 7 is a sectional view of a cam and cam follower of an actuator of the camera shown in FIG. 1.

In the illustrated example, the actuator 77 comprises a cam and cam follower mechanism including a ball bearing 93 shown in FIG. 7. The ball bearing 93 has an inner race 95, a plurality of needles or balls 96 and an outer race 97. The inner race 95 is mounted on the axis 79 of the motor 25. The axis 79 and the inner race 95 which is fixed to the axis 79 have a common axis of rotation 99 which is displaced in a radial direction of the axis 99 relative to an axis of symmetry 101 of the inner and outer races 95, 96 by an amount δ of 0.1 mm in the illustrated example. With such configuration it is possible to displace the pin 71 in the direction 75 by rotating the axis 79 of the motor by 180°. A further rotation of the motor in the opposite direction will result in a displacement of the pin 71 in the opposite direction 73 due to the action of the spring loaded pin 69. The stepping motor 25 of the illustrated example has 800 steps per revolution, such that it is possible to precisely displace and move the image sensor 36 relative to the housing 9 under the control of the motor 25, wherein a maximum displacement amplitude is 0.2 mm. It is in particular possible to control the motor 25 such that the image sensor 36 is moved at a constant velocity relative to the housing and lens 53 during an exposure time of the image sensor 36.

Further details of the camera 1 and methods of controlling the camera will be illustrated with reference to FIGS. 8 and 9 below.

Figure 8:
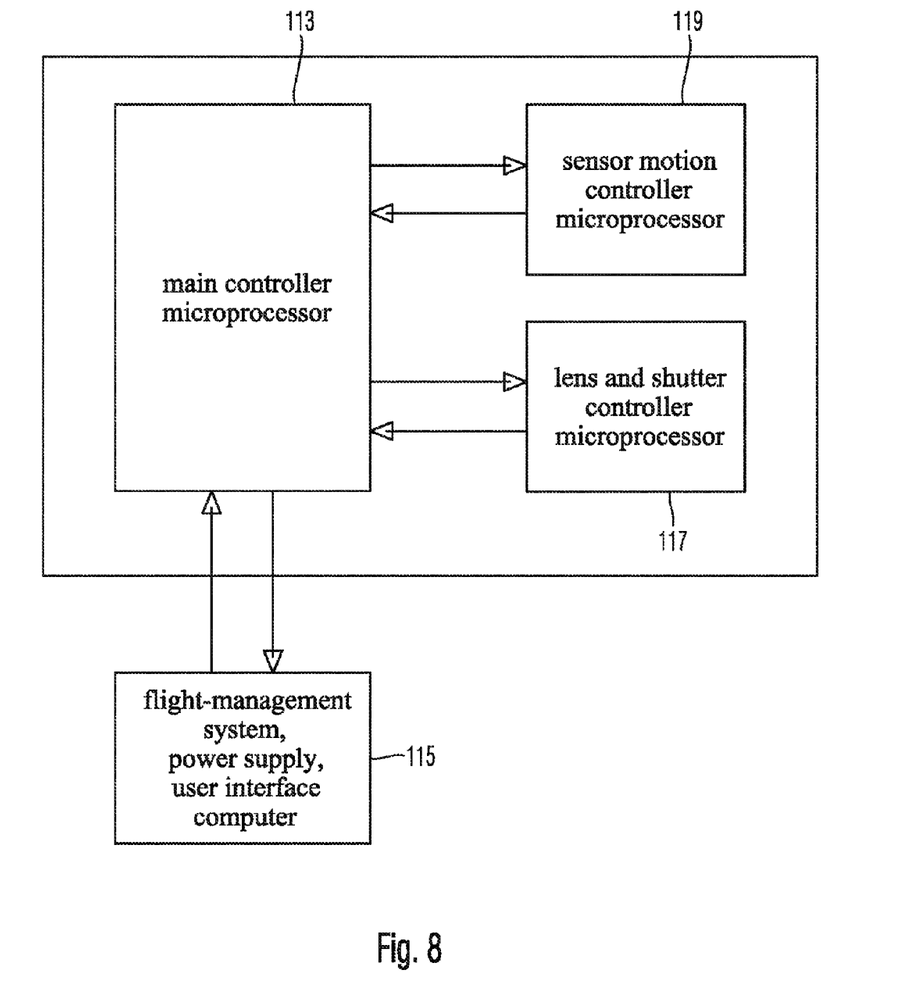
FIG. 8 is a schematical representation of a control system of the camera shown in FIG. 1.

FIG. 8 is a schematic representation of a camera control system 111 which comprises three control modules: a main control module 113 has a function of a main controller and is embodied in a microprocessor included in the control unit 19. The main controller is connected to a power supply for the camera control system 111, a user interface and a flight management system which can be embodied in one or more computers 115. The user interface is used to configure the camera and set parameters needed to operate the camera. The flight management system supplies relevant information to the main controller which may comprise a distance from the object to be imaged, i.e. the ground distance if the camera is mounted on an aircraft, and a speed of the camera relative to the object. The main controller uses data obtained from the flight management system to determine the constant speed with which the sensor is to be moved relative to the lens during exposure. Moreover, the recording of an image, i.e. exposure of the sensor, can be triggered by the flight management system or the user interface, and the image data of the recorded image can be transferred from the main controller 113 to one or more of the computers embodying the flight management system or user interface.

The camera control system 111 further comprises a lens and shutter control module 117 which includes actuators and a controller embodied in a microprocessor which can be mounted on the lens 3 and connected to the main controller 113 via the cable 21. The main controller 113 supplies parameters such as an opening aperture to be used in the next exposure to the lens and shutter controller, and it also triggers the lens and shutter controller 117 to execute a shutter cycle comprising opening of the shutter, maintaining the shutter open during the exposure time and closing the shutter. The lens and shutter controller 117 supplies a signal to the main controller as soon as opening of the shutter is completed subsequent to triggering the shutter cycle. The main controller may then determine the shutter delay by calculating the difference between the time when the signal occurs and the time when the shutter cycle was triggered. The main controller 113 can store the determined shutter delay and use it for triggering the next exposure. However, it is also possible that the lens and shutter controller comprises a memory to store the shutter delay, and the main controller 113 may read the shutter delay from the lens and shutter controller. Still further, it is possible that the lens and shutter controller determines the shutter delay based on a time difference as illustrated above. Still further, it is possible that the shutter delays are pre-stored in a memory contained in the main controller or the lens and shutter controller based on a calibration performed when the camera was manufactured, wherein such calibration can be repeated in regular service intervals.

The camera control system 111 further comprises a sensor motion control module 119 including a sensor motion controller embodied in a microprocessor, and the actuator including the motor 25 and the cam and cam follower 93, 71. The sensor motion controller receives parameters such as the constant velocity of the image sensor and a signal triggering a sensor movement cycle from the main controller. The sensor motion controller also operates the motor 25 such that it moves to a predetermined rotational home position after completion of a movement cycle such that is ready for a next exposure. The light sensor 91 detecting the position of the eccentric blade 89 is read out by the controller 119 to reposition the motor.

The control system 111 illustrated in FIG. 8 has three different control modules. Such separation into three different control modules can be performed at least for illustrative purposes. Moreover, the three control modules can be physically separated into three separate units. This is not necessary, however, as physical components embodying the modules can be located at various places of the camera 1. For example, the main controller 113 can be located in the control unit 19, while the lens and shutter controller is located within the lens 3. However, it is also possible that the sensor motion control module and the main control module and/or other modules are embodied in one single microprocessor which is located within the control unit 19 or at some other suitable location of the camera 1.

Figure 9:
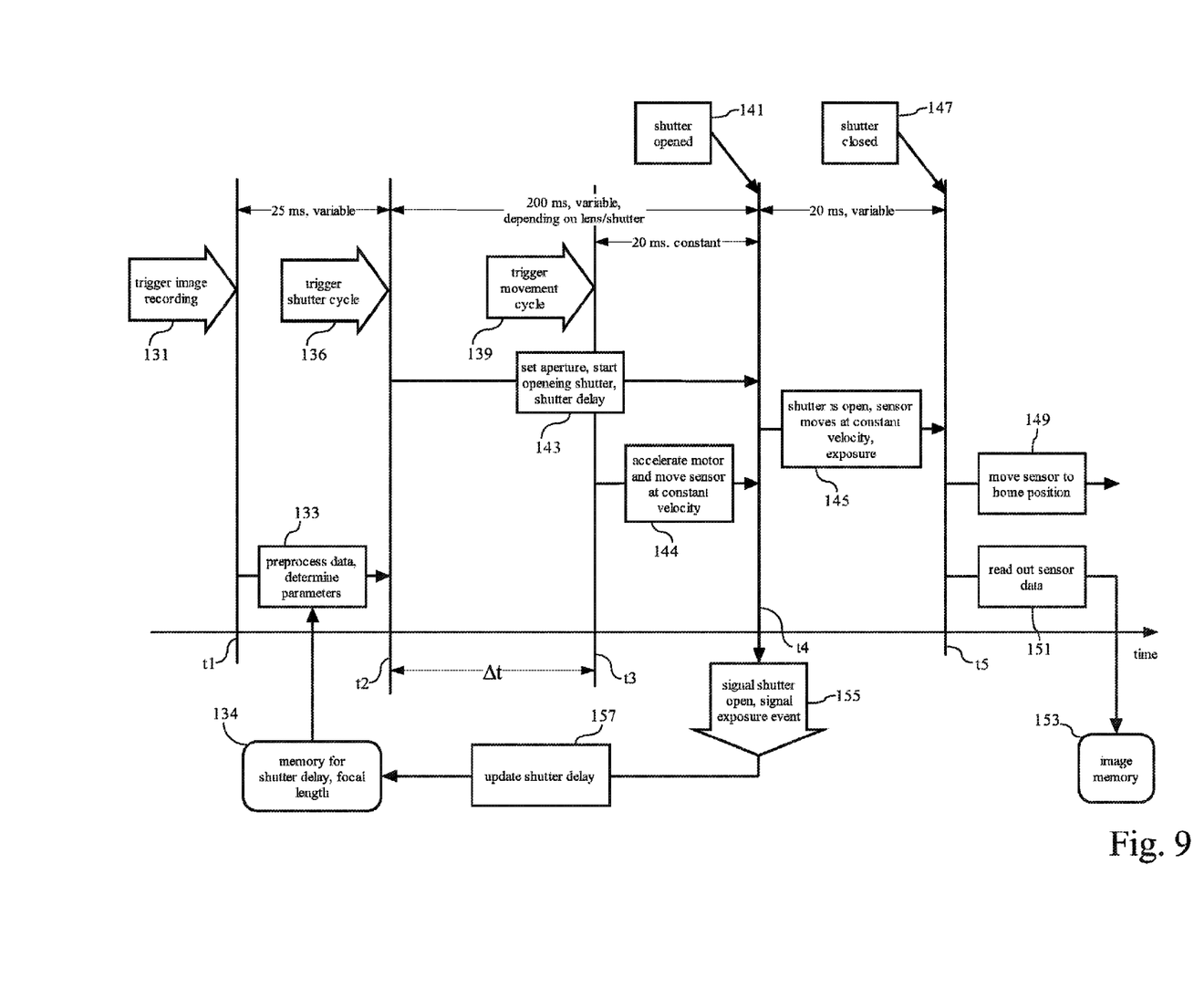
FIG. 9 is a flowchart illustrating a control method of the camera shown in FIG. 1.

FIG. 9 is a time diagram representing increasing time from left to right and showing various events and actions occurring in one exposure cycle of the camera 1.

A signal 131 triggering an image recording is received by the camera control system 111 from the flight management system or user interface 115 at a time t1. The main controller 113 performs a processing 133 to determine parameters necessary for performing the exposure. These parameters include the constant velocity of the image sensor relative to the lens during exposure and a diameter of the aperture opening during exposure.

The determined parameters also include a time difference Δt which should be provided between triggering of the shutter cycle and triggering of the sensor movement cycle. A duration of the determination of the parameters necessary for performing an exposure may vary based on the circumstances and may take, for example, 25 ms.

The determination of these parameters is based on parameters received from the flight management system, such as distance from ground and ground speed, and parameters stored in a memory 134 within the control system 111, such as the shutter delay and focal length of the lens used for imaging.

After determination of the parameters necessary, the main controller 113 sends, at a time t2, a signal 136 to the lens and shutter controller 117 to trigger a shutter cycle, and, at a time t3, a signal 139 to the sensor motion controller 119 to trigger a sensor movement cycle, wherein a time difference between t3 and t2 is Δt.

Subsequent to receipt of the signal 136 triggering the shutter cycle, the lens and shutter controller 117 performs an action 143 which sets the aperture to be used during the exposure and starts opening the shutter such that the shutter is completely opened (see event 141) at a time t4. A time difference between the time t4 when the shutter is completely opened and the time t2 when the shutter cycle is triggered is referred to as the shutter delay 143. The shutter delay may take some 100 ms and depends on the set aperture and the shutter type and lens mounted on the camera. In the illustrated example, the shutter delay is 200 ms.

Subsequent to receipt of the signal 139 triggering the sensor movement cycle, the sensor motion controller 119 performs an action 144 which starts accelerating the sensor and maintaining the sensor at the determined constant speed for a while to allow oscillations caused by the acceleration to get damped and reduced such that the sensor moves at the constant speed at the time t4 so that also the image sensor is ready for exposure.

The time difference Δt has been determined by the main controller 113 such that both opening of the shutter and stable sensor movement are achieved at the time t4. Moreover, the time difference Δt is determined such that the movement of the sensor has progressed such that, at the time t4, an optical axis of the lens intersects a same pixel 34 (see FIG. 4) of the image sensor in each exposure cycle controlled by the main controller.

The exposure is performed in an action 145 during a time interval from t4 to t5, while the shutter is open and the sensor moves at the constant velocity. The exposure is terminated at the time t5 by closing the shutter (see event 147). Subsequent to the completion of the exposure at t5, the image sensor is moved back to its starting position in an action 149, and the image data recorded by the sensor is read out to an image memory 153 which can be included in the computer 115 in an action 151.

The shutter is configured to generate a signal 155 at time t4, when the shutter is completely opened such that the lens and shutter controller or the main controller may determine the actual shutter delay of the shutter used in the camera by calculating the difference between time t4 and time t2. It is then possible to update (157) the shutter delay stored in the memory 134 and use it in a next exposure cycle.

An arrangement including the components as shown in FIG. 4 and a motor 25 as shown in FIG. 6 mounted on the plate 15 can be used as an upgrade kit for an existing camera which does not offer forward motion correction, such that the existing camera will be able to provide forward motion correction when the components mentioned above are mounted on the housing of the camera.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. An aerial digital camera comprising:
   a housing;
   a lens adapter mounted on the housing and configured to receive a lens;
   a frame;
   an image sensor mounted on the frame;
   at least three flexure bearings connecting the frame and the housing, the flexure bearings allowing a displacement of the frame relative to the housing in a displacement direction parallel to a light receiving surface of the image sensor;
   a spring providing a biasing force between the housing and the frame oriented in the displacement direction; and
   an actuator configured to displace the frame relative to the housing against the biasing force of the spring,
   wherein the actuator comprises a motor, a cam rotatably supported on the housing and driven by the motor, and a cam follower engaging the cam,
   wherein the cam follower abuts against the frame, and
   wherein the cam and the cam follower include a ball bearing having an inner race and an outer race, wherein a center of the inner race is displaced in a radial direction of the inner race relative to an axis of rotation of the inner race.

2. The aerial digital camera according to claim 1, wherein at least one of the at least three flexure bearings includes an elongated strip of a flexible material.

3. The aerial digital camera according to claim 1, further comprising a shutter.

4. The aerial digital camera according to claim 3, further comprising a control system configured to control the shutter and the actuator.

5. An aerial digital camera upgrade kit comprising:
   a housing element configured to be integrated into an aerial digital camera and to provide a component of a housing of the aerial digital camera;
   a frame configured to receive an image sensor;
   at least three flexure bearings connecting the frame and the housing element, the flexure bearings allowing a displacement of the frame relative to the housing element in a displacement direction parallel to a light receiving surface of the image sensor;
   a spring providing a biasing force between the housing and the frame oriented in the displacement direction; and
   an actuator configured to displace the frame relative to the housing against the biasing force of the spring,
   wherein the actuator comprises a motor, a cam rotatably supported on the housing and driven by the motor, and a cam follower engaging the cam,
   wherein the cam follower abuts against the frame, and
   wherein the cam and the cam follower include a ball bearing having an inner race and an outer race, wherein a center of the inner race is displaced in a radial direction of the inner race relative to an axis of rotation of the inner race.

6. The aerial digital camera upgrade kit according to claim 5, wherein the actuator is mounted on the housing element.

7. The aerial digital camera upgrade kit according to claim 5, wherein the spring is mounted on the housing element.

8. The aerial digital camera according to claim 5, wherein at least one of the at least three flexure bearings includes an elongated strip of a flexible material.

9. A method of upgrading an existing aerial digital camera to provide forward motion compensation, the method comprising:
   mounting an upgrade kit to the existing camera, the upgrade kit comprising:
   a housing element configured to be integrated into the existing camera and to provide a component of a housing of the existing camera;
   a frame configured to receive an image sensor;
   at least three flexure bearings connecting the frame and the housing element, the flexure bearings allowing a displacement of the frame relative to the housing element in a displacement direction parallel to a light receiving surface of the image sensor;
   a spring providing a biasing force between the housing and the frame oriented in the displacement direction; and
   an actuator configured to displace the frame relative to the housing against the biasing force of the spring,
   wherein the actuator comprises a motor, a cam rotatably supported on the housing and driven by the motor, and a cam follower engaging the cam,
   wherein the cam follower abuts against the frame, and
   wherein the cam and the cam follower include a ball bearing having an inner race and an outer race, wherein a center of the inner race is displaced in a radial direction of the inner race relative to an axis of rotation of the inner race.

* * * * *